US007555768B2

(12) United States Patent
Norman

(10) Patent No.: US 7,555,768 B2
(45) Date of Patent: Jun. 30, 2009

(54) APPARATUS METHOD AND SYSTEM FOR PROVIDING ENHANCED DIGITAL SERVICES USING AN ANALOG BROADCAST LICENSE

(75) Inventor: George I. Norman, Salt Lake City, UT (US)

(73) Assignee: Brain Tree International, Inc, Salt Lake City, UT (US)

( * ) Notice: Subject to any disclaimer, the term of this patent is extended or adjusted under 35 U.S.C. 154(b) by 1169 days.

(21) Appl. No.: 10/620,303

(22) Filed: Jul. 14, 2003

(65) Prior Publication Data

US 2005/0015811 A1  Jan. 20, 2005

(51) Int. Cl.
  *H04N 7/173* (2006.01)
(52) U.S. Cl. ............... 725/117; 725/62; 725/126
(58) Field of Classification Search .......... 725/31, 725/62, 105–106, 109–111, 114–118, 120–121, 725/126; 348/384.1, 385.1
  See application file for complete search history.

(56) References Cited

U.S. PATENT DOCUMENTS

| 4,238,849 | A |   | 12/1980 | Gassmann ................. 370/11 |
| 4,288,868 | A |   | 9/1981  | Grotjohann et al. ........ 370/30 |
| 4,852,086 | A |   | 7/1989  | Eastmond et al. ......... 370/69.1 |
| 5,465,396 | A |   | 11/1995 | Hunsinger et al. .......... 455/61 |
| 5,553,079 | A |   | 9/1996  | Niki et al. .............. 370/110.4 |
| 5,592,540 | A |   | 1/1997  | Beveridge ................. 379/184 |
| 5,757,854 | A |   | 5/1998  | Hunsinger et al. ......... 375/260 |
| 5,790,936 | A |   | 8/1998  | Dinkins .................... 455/5.1 |
| 5,812,930 | A |   | 9/1998  | Zavrel ...................... 455/5.1 |
| 5,822,324 | A | * | 10/1998 | Kostresti et al. ........... 370/487 |
| 5,850,415 | A |   | 12/1998 | Hunsinger et al. ......... 375/216 |
| 5,930,231 | A | * | 7/1999  | Miller et al. ............... 370/210 |
| 5,949,796 | A |   | 9/1999  | Kumar ...................... 370/529 |
| 6,118,976 | A |   | 9/2000  | Arias et al. ................ 455/5.1 |
| 6,246,698 | B1 |  | 6/2001  | Kumar ...................... 370/487 |
| 6,510,175 | B1 |  | 1/2003  | Hunsinger et al. ......... 375/216 |
| 6,584,122 | B1 |  | 6/2003  | Matthews et al. .......... 370/493 |
| 7,225,162 | B2 | * | 5/2007  | Kim et al. ..................... 705/51 |
| 2001/0050926 | A1 | | 12/2001 | Kumar ...................... 370/529 |
| 2002/0028680 | A1 | | 3/2002  | Jenkins et al. .............. 455/454 |

(Continued)

FOREIGN PATENT DOCUMENTS

WO          88/03342          5/1988

(Continued)

*Primary Examiner*—Hunter B. Lonsberry
(74) *Attorney, Agent, or Firm*—Kunzler & McKenzie

(57) ABSTRACT

A transmission spectrum historically associated with analog broadcast signals is leveraged for digital transmission to provide broadcast channels and user-requested channels to a specific geographic region. In addition to broadcast data such as television programming, digital newspapers, and movie channels, back-channels are used to provide interactive and bi-directional communications necessary for on-demand content, internet access, video games, telephone services, and the like. The back-channels may be transmitted via wireless, telephone modem, DSL, or other means. The broadcast license associated with the present invention may be a commercial broadcast license, a public service license, a low power license, or the like. To increase the available channels and associated services, the original analog signal may be replaced by digital transmission signals. To further increase the quantity of services, directional transmission and reception of both user-requested channels and back-channels may be used along with multiple transmission towers to support those channels.

84 Claims, 7 Drawing Sheets

U.S. PATENT DOCUMENTS

| | | | |
|---|---|---|---|
| 2002/0049037 A1 | 4/2002 | Christensen et al. | 455/3.06 |
| 2002/0059615 A1* | 5/2002 | Okawara et al. | 725/78 |
| 2002/0106987 A1 | 8/2002 | Linden | 455/12.1 |
| 2002/0136231 A1 | 9/2002 | Leatherbury et al. | 370/442 |
| 2002/0147978 A1* | 10/2002 | Dolgonos et al. | 725/62 |
| 2003/0005452 A1 | 1/2003 | Rodriguez | 725/86 |
| 2003/0196211 A1* | 10/2003 | Chan | 725/131 |
| 2004/0172658 A1* | 9/2004 | Rakib et al. | 725/120 |

FOREIGN PATENT DOCUMENTS

| | | |
|---|---|---|
| WO | 91/08629 | 6/1991 |

\* cited by examiner

APPARATUS METHOD AND SYSTEM FOR PROVIDING ENHANCED DIGITAL SERVICES USING AN ANALOG BROADCAST LICENSE

BACKGROUND OF THE INVENTION

1. Field of the Invention

The present invention relates to digital communications and content delivery systems. Specifically, the invention relates to providing enhanced digital services to a geographic region corresponding to an analog broadcast license.

2. Description of the Related Art

Digital technology in general and digital communications in particular have ushered in an age of convergence wherein formerly separate media types often share common mechanisms for distribution and viewing. For example, digital-based cable systems within hotels, homes, and businesses offer a wide variety of entertainment selections such as movies, television programs, video games, music channels, and weather channels, in addition to other services such as internet access, telephone service, and the like. However, the cost of building the infrastructure for such systems remains a barrier to accessing many markets, particularly small and geographically dispersed markets such as small towns and farming communities.

In contrast to digital-based cable systems, existing non-cable broadcast systems are typically restricted to delivery of one media type or service. Examples of non-cable broadcast systems include AM radio, FM radio, VHF television programming, and UHF television programming. Each of the aforementioned radio and television programming systems are presently confined to broadcasting either radio or television signals, respectively.

FIG. 1 illustrates a typical prior art broadcast system namely an analog-based content delivery system 100. The analog-based content delivery system 100 illustrates the advantages and disadvantages of currently available broadcast systems that operate within existing licensed spectrums. As depicted, the content delivery system 100 includes a large number of residences 110, a transmission facility 120, a transmission tower 130, and one or more broadcast antennas 140.

In certain broadcast systems, such as FM radio, VHF television, and UHF television systems, the residences 110 are spread across a geographic region such as a neighborhood, a metropolitan area, a valley, or the like that is within line of sight of the transmission tower 130. In other broadcast systems, such as AM radio systems, the residences 110 may be spread across an entire country or continent. The depicted broadcast infrastructure, in conjunction with a broadcast license (not shown,) enables a broadcaster to transmit content to the residences 110.

One advantage of analog-based content delivery systems 100 is low deployment cost. This low deployment cost is achieved in part by avoiding the expenditure of resources on a transmission line infrastructure between the transmission facility 120 and the residences 110. In addition, reception equipment for receiving analog content is inexpensive and widely available.

Another advantage of analog-based content delivery systems 100 is that these systems 100 already exist in many remote areas of the world. Content providers that utilize these systems 100 have penetrated many markets that are currently inaccessible to digital-based cable systems, digital subscriber line (DSL) systems, or the like.

Despite the aforementioned benefits, analog-based content delivery systems 100 do not offer the advantages of digital convergence. For example, lack of digital data compression results in poor bandwidth utilization for such systems. In addition, content is typically restricted to one media type such as television programming or radio programming. Furthermore, communications are unidirectional and non-interactive, and internet access or telephone service is not available with such systems.

In addition to the analog-based content delivery system 100 of FIG. 1, other communication technologies have problems that restrict digital convergence. For example, within the telephone industry, digital subscriber line (DSL) service provides consumers with fairly high communication bandwidth. However, due to the limitations of the internet and its ad hoc infrastructure, such service is typically ineffective in delivering high bandwidth content such as movies or television programs.

Accordingly, what is needed are cost-effective apparatus, methods, and systems that offer the advantages of digital convergence to a broader customer base and in a superior manner than currently available systems. Such systems would provide many of the advantages of digital-cable systems and DSL systems without the associated disadvantages that currently limit digital convergence.

BRIEF SUMMARY OF THE INVENTION

The present invention has been developed in response to the present state of the art, and in particular, in response to the problems and needs in the art that have not yet been fully solved by currently available digital services delivery means and methods. Accordingly, the present invention has been developed to provide an apparatus, method, and system for providing enhanced digital services that overcome many or all of the above-discussed shortcomings in the art.

The present invention facilitates providing digital services such as content delivery, internet access, phone service, and the like to a specific geographic region corresponding to a broadcast license using a transmission spectrum historically associated with analog broadcast signals. The spectrum historically dedicated to analog broadcast signals may be a spectrum appropriate to a particular market or geographic region. Using an existing spectrum facilitates using existing transmission and broadcast facilities and equipment and reduces the cost of deploying enhanced digital services.

The broadcast license associated with the present invention may be a commercial broadcast license, a public service license, a low power license, or the like. For example, in the United States the transmission spectrum may be a FM spectrum, an AM spectrum, a VHF spectrum, a UHF spectrum, or the like. In one embodiment, transmission of the digital content is conducted in a manner that precludes transmission of an analog broadcast signal for which a license was originally issued. Precluding transmission of the analog signal replaces obsolete transmission signals and with better transmission formats.

The present invention replaces the analog-based communications of existing licensed spectrums with digital communications and thereby increases the quantity and quality of services that may be provided to a specific geographic region. To increase quantity of services even further, the present invention may use directional transmission and reception of both forward channels and back-channels. Directional transmission facilitates concurrently transmitting different data in different directions using the same channel. Directional reception facilitates receiving different data from different directions using the same channel.

The digital content delivered with the present invention may be encrypted to facilitate revenue generation and protect copyrighted content. The digital content may include audio content, movies, television programs and series, video games, news programs, sports events, sports tournaments, or the like. In one embodiment, the digital content includes a newspaper having the same layout and format as a printed edition of the newspaper.

In one aspect of the present invention, a system for delivering digital services includes a transmitter configured to transmit broadcast data on one or more broadcast channels within a spectrum historically dedicated to analog broadcast signals while concurrently transmiting user requested data on one or more user channels. The system further includes a receiver configured to convert a selected broadcast channel of the plurality of broadcast channels to a digital data stream.

The system for delivering digital services may also include a back-channel receiver configured to conduct back-channel communications, and a digital content server configured to store digital content and fulfill digital content requests from a plurality of users. In one embodiment, the broadcast data may be received from a selected data source that includes a broadcast network, a digital content server, a telephone network, and the internet.

In one particular embodiment of the present invention, the system for delivering digital services is optimized to provide telephone service to a specific geographic region by configuring the transmitter and the back-channel receiver and other associated equipment to transmit and receive telephony data within the spectrum historically dedicated to analog broadcast signals.

In another aspect of the present invention, an apparatus for delivering digital services includes one or more broadcast data sources configured to provide broadcast data, one or more user data sources configured to provide user requested data, a transmitter configured to transmit the broadcast data on a broadcast channel within a spectrum historically dedicated to analog broadcast signals. The transmitter is also configured to transmit the user-requested data on a user channel within the spectrum historically dedicated to analog broadcast signals.

The broadcast data sources may be any source appropriate to providing broadcast programming such as a broadcast network, a digital content server, a telephone network, and the internet. The broadcast data may be published and transmitted to the entire region corresponding to a broadcast license. In one embodiment, the broadcast data includes audio selections, movies, television programs, video games, news programs, sporting events, email messages such as emergency messages intended for the public, and web pages such as publicly intended informational sites.

The user-requested data may include many of the same types of data as the broadcast data provided on-demand rather than broadcast. In addition, the user-requested data may include data related to private communications such as internet access, online chatting, and telephone conversations. In one embodiment, the user-requested data is encrypted for privacy. Due to the superiority of digital communications over analog communications additional channels may be provided to a broadcast region over that of traditional analog communications.

The apparatus for delivering digital services may include a digital content server configured to store digital content and fulfill digital content requests from users, and a back-channel receiver configured to conduct back-channel communications. In certain embodiments, the digital content server is also configured to encrypt digital content. The digital content requests may be generated via back-channel communications, telephone communications, email communications, web page communications, or the like.

The apparatus for delivering digital services may be configured to directionally transmit and receive certain channels such as user channels and back-channels in order to facilitate interaction and bi-directional communications such as may be required for internet access or telephone services. In one embodiment, the user channels and back-channels lie within a spectrum historically dedicated to analog broadcast signals In another aspect of the invention, a customer premises transceiver for delivering digital services to a customer includes an antenna configured to receive a digitally encoded transmission signal within a spectrum historically dedicated to analog broadcast signals and a receiver configured to convert a selected channel within the digitally encoded transmission signal to a digital data stream. The selected channel may be a broadcast channel or a user-requested channel. The transceiver facilitates providing digital services to a customer including broadcast services, internet access, telephone service, e-mail, content-on-demand, video games, and the like.

In addition to the receiver and antenna, the customer premises transceiver may also include a program selector that enables a user to select and request specific digital content, a back-channel transmitter that facilitates back-channel communications, a decryption module that decrypts encrypted digital content, a content storage device to store digital content, and a telephone interface that facilitates hooking up a standard telephone and providing telephone services to the customer.

The back-channel transmitter may be any transmitter that facilitates back-channel communication, such as a telephone modem, a cellular phone transmitter, a digital subscriber line interface, or a wireless transmitter. In one embodiment, the transmitter is a wireless transmitter configured to transmit within the spectrum historically dedicated to analog broadcast signals.

The customer premises transceiver facilitates selection of content and real-time or deferred viewing of selected content. In addition, interactive and bi-directional communications such as internet access and telephone conversations may be supported by the transceiver In another aspect of the present invention, a method for delivering digital services includes securing a license to broadcast within a spectrum historically dedicated to an analog broadcast signal, transmitting broadcast data on at least one broadcast channel within the historically dedicated spectrum, and transmitting user data on at least one user channel within the historically dedicated spectrum. The transmission of broadcast data and user data may be conducted in a manner that precludes transmission of the analog broadcast signal.

The method for delivering digital services may also include conducting communications including receiving requests for digital content on at least one user back-channel. The back-channel communications may occur through any suitable means such as telephone modem communications, cellular phone communications, digital subscriber line communications, internet communications, and wireless communications, for example, within the spectrum historically dedicated to analog broadcast signals. The requests for digital content may also occur through means other than a dedicated back-channel, such as receiving a telephone call or receiving internet communications.

The method for delivering digital services may also include receiving a program selection from a user, providing or selling an encryption key configured to enable reception of encrypted digital content, and broadcasting at a published time. For example the published time may be published in a newspaper or via a programming selection channel.

In one embodiment, the method for delivering digital services includes broadcasting a digital edition of a newspaper that is formatted substantially the same as a printed edition of the newspaper. Delivering a digital newspaper in substantially the same format as a printed edition of the newspaper greatly reduces the printing and distribution costs associated with publishing newspapers.

In another aspect of the present invention, a method for receiving digital services includes receiving a digitally encoded transmission signal within a spectrum historically dedicated to analog broadcast signals and converting the digitally encoded transmission signal to a digital data stream. The method may also include transmitting a digitally encoded back-channel transmission signal within the spectrum historically dedicated to analog broadcast signals, directionally transmitting the digitally encoded back-channel transmission signal, and directionally receiving the digitally encoded transmission signal.

The method may also include receiving a digital edition of a newspaper that is formatted substantially the same as a printed edition of the newspaper, and transmitting data on a user back-channel, purchasing an encryption key configured to enable reception of encrypted digital content, selecting a program, selecting a program series, or the like.

The various elements and aspects of the present invention improve the usage of existing facilities and spectrums over traditional uses. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 through 7, is not intended to limit the scope of the invention, as claimed, but is merely representative of selected embodiments of the invention.

Some of the functional units described in this specification have been explicitly labeled as modules in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. While many of the functional units described in this specification have not been labeled as modules, the aforementioned attributes of modules are assumed to apply to all of the functional units described herein.

Figure 1:
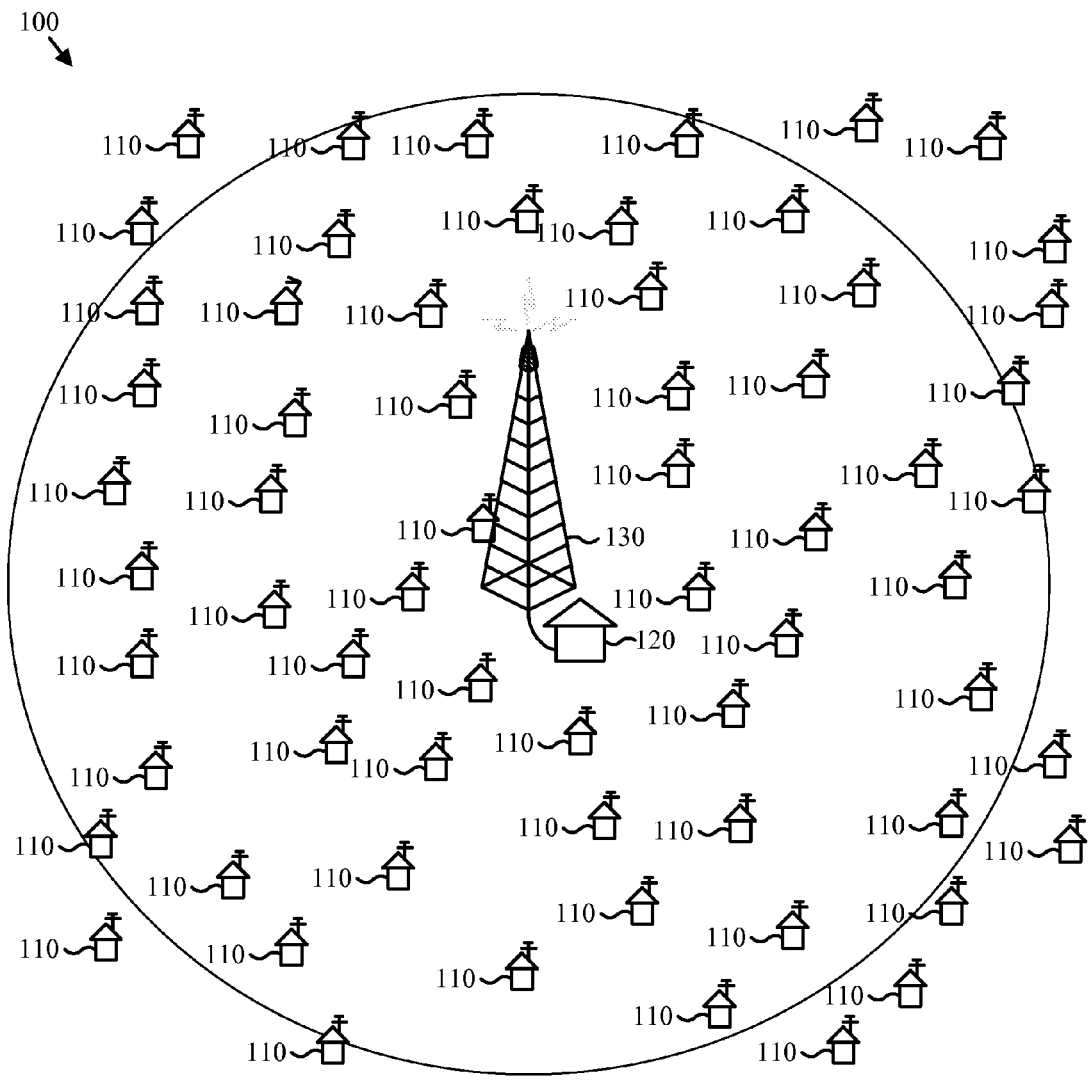
FIG. 1 is a schematic block diagram illustrating one embodiment of a prior art analog-based content delivery system.
Figure 2:
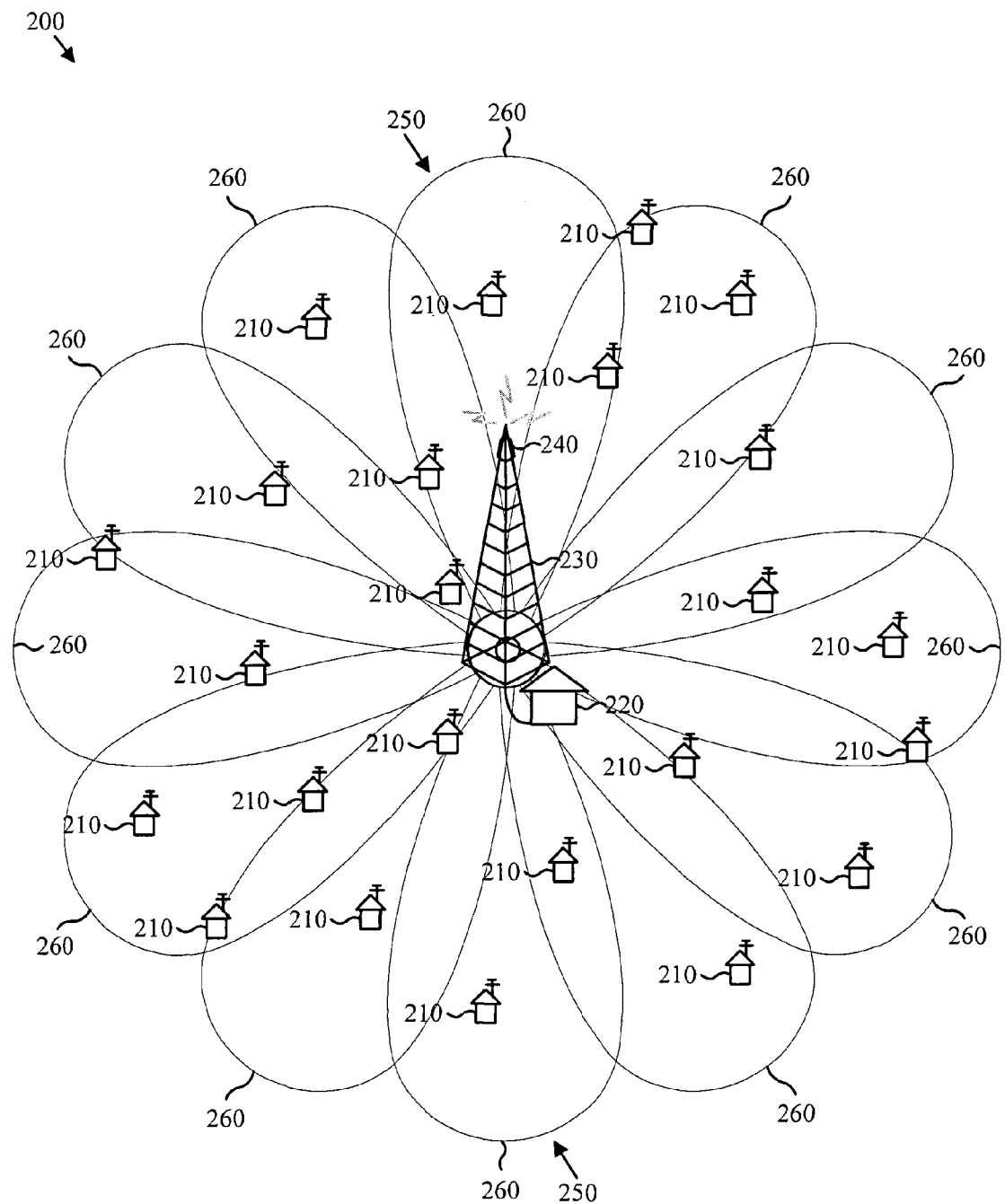
FIG. 2 is a schematic block diagram illustrating one embodiment of an enhanced digital services delivery system of the present invention.

FIG. 2 is a schematic block diagram illustrating one embodiment of an enhanced digital services delivery system 200 of the present invention. As depicted, the enhanced digital services delivery system 200 includes a number of residences 210 equipped with digital receivers, a digital services transmission facility 220, a transmission tower 230, and antenna(s) 240. For visual clarity, residences that are not equipped with digital receivers (such as the residences 110 of FIG. 1) are omitted from the diagram.

The digital services delivery system 200 is designed to operate within an existing licensed spectrum similar to that of the prior art system depicted in FIG. 1. However, the digital services transmission facility 220 may include equipment that facilitates delivering broadcast programming in digital form to the residences 210. The digital broadcast programming may comprise, for instance, television programming, radio programming, movies, cable channels, or the like. Furthermore, the residences 210 and the transmission facility 220 may include equipment that facilitates back-channel communications.

Back-channel communications facilitates offering interactive services such as movies-on-demand, video games, and internet access. The means for back-channel communications may be selected according to the needs and capabilities of the particular market. For example, back-channel communications may include telephone modem communications, cellular phone communications, digital subscriber line communications, internet communications, and wireless communications within a spectrum typically used for broadcasting.

In certain embodiments, the residences 210, the antenna(s) 240, and the transmission facility 220 are equipped for bi-directional wireless communications. In one embodiment, the wireless communications occur within a spectrum historically dedicated to analog broadcast signals. To increase the number of channels, particularly user-requested channels including telephone channels, the antenna(s) 240 and the transmission facility 220 may be configured to directionally transmit and/or directionally receive wireless communications in a particular radiation pattern 250.

The radiation pattern 250 may be selected according to the needs of a particular market. Considerations may include the density of penetration and the usage patterns for user-requested channels. Each leaf or lobe 260 in the pattern may carry different content or services within the same channels. In the depicted embodiment, the antenna(s) 240 and the transmission facility 220 are configured to omni-directionally transmit a set of broadcast channels using an omni-directional antenna.

In addition, the antenna(s) 240 and the transmission facility 220 may be configured to directionally transmit and directionally receive a different set of user-requested channels within each lobe 260 using a set of directional antennas 240. In another embodiment—for example in a new market—the radiation pattern 250 is essentially omni-directional for both the broadcast channels and the user-requested channels.

Figure 3:
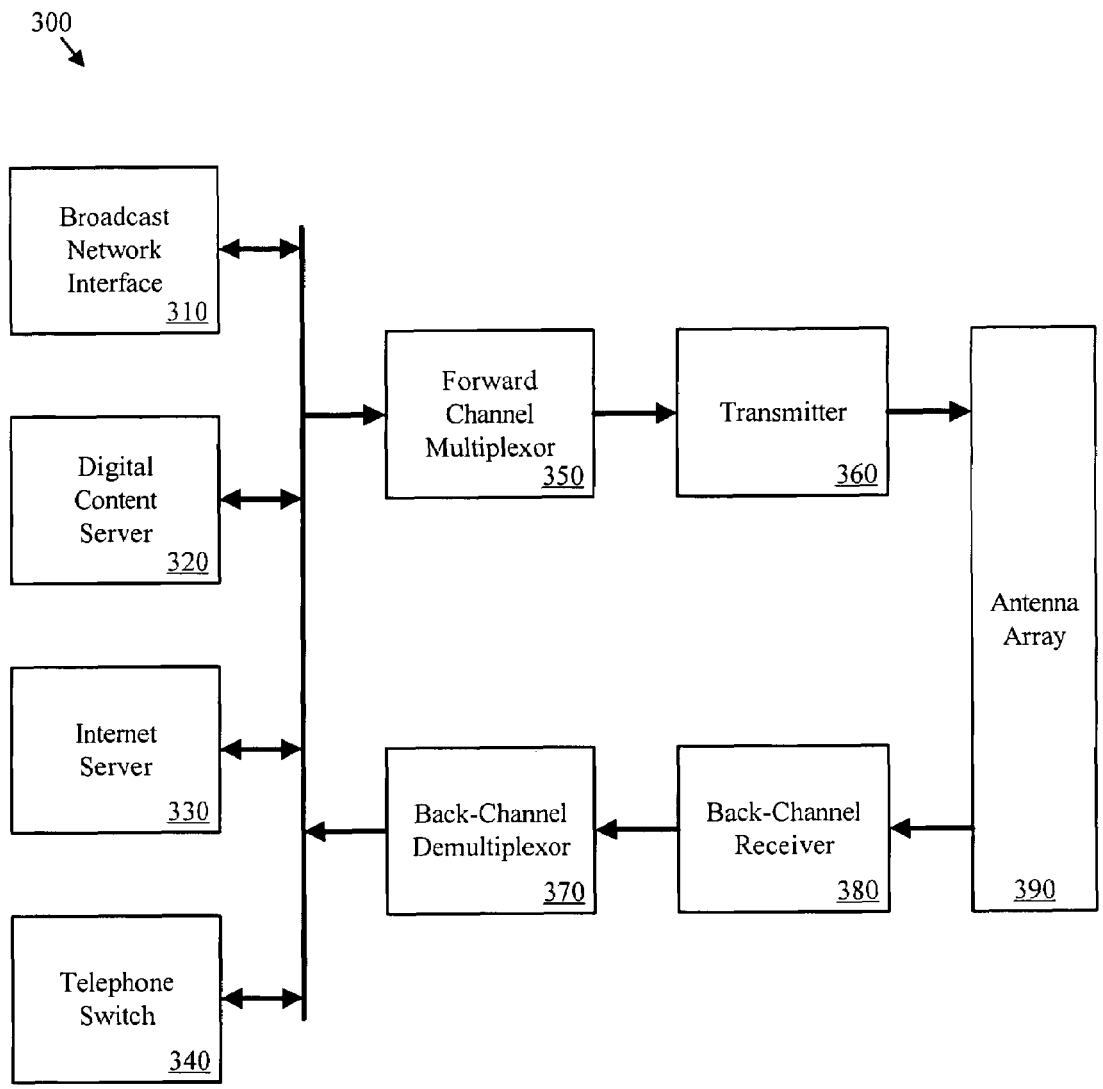
FIG. 3 is a block diagram illustrating one embodiment of an enhanced digital services transmission facility of the present invention.

FIG. 3 is a block diagram illustrating one embodiment of an enhanced digital services transmission facility 300 of the present invention. The enhanced digital services transmission facility 300 is one example of the transmission facility 220 depicted in FIG. 2. The enhanced digital services transmission facility 300 facilitates providing enhanced digital services such as television programming, cable programming, radio programming, movies-on-demand, music-on-demand, internet access, phone service, and the like to a selected geographic region. The geographic region may be, in one example, a broadcast area corresponding to a broadcast license within a spectrum historically dedicated to analog broadcast signals.

In the depicted embodiment, the enhanced digital services transmission facility 300 includes a broadcast network interface 310, a digital content server 320, an internet server 330, a telephone switch 340, a forward channel multiplexor 350, a transmitter 360, a back-channel demultiplexor 370, a back-channel receiver 380, and an antenna array 390.

The enhanced digital services transmission facility 300 includes a number of components that facilitate providing enhanced digital services to customers such as mobile users, residences, and businesses. For example, the broadcast network interface 310 facilitates transmitting a broadcast stream from a programming network such as a television network, a radio network, a cable network, or the like. The digital content server 320 provides digital content such as movies, video games, or music. The internet server 330 provides internet access and associated TCP/IP communications such as emails, FTP transfers, web pages, or the like. In one embodiment, content is transmitted from the broadcast network interface 310 or the internet server 330 and stored on the digital content server 320 for later use.

The telephone switch 340 facilitates providing telephone services. In one embodiment, the telephone switch 340 is a tandem switch connected to a central office. In addition, the telephone switch 340 may also facilitate communication among existing cellular phone networks and the telephone services provided by the digital services transmission facility.

The forward channel multiplexor 350 multiplexes various data sources such as the broadcast network interface 310, the digital content server 320, the internet server 330, and the telephone switch 340 on to specific channels for transmission to a customer. In one embodiment, each channel carries content corresponding to a different type of media. Alternatively, several channels may be devoted to each type of media.

The transmitter 360 transmits the multiplexed channels to the customers. The transmitter 360 may include an encoding module (not shown) that encodes the channels onto wireless channels such as spread spectrum channels. The transmitter 360 or another component within the facility 300, such as the digital content server 320, may also include an encryption module that scambles or encrypts specific channels such as channels containing premium content.

The antenna array 390 radiates the multiplexed and possibly encrypted channels as electromagnetic signals. In certain embodiments, some of the channels are broadcast channels that are omni-directionally radiated while other channels are user-requested channels that are directionally radiated. The antenna array 390 may also receive channels in the form of electromagnetic signals from mobile or stationary customers. In one embodiment, electromagnetic signals corresponding to a set of back-channels is directionally received by the antenna array 390 and presented to the back-channel receiver 380.

The back-channel receiver 380 converts electromagnetic signals provided by the antenna array 390 to a set of back-channels. The back-channel demultiplexor 370 demultiplexes the back-channels into separate channels which may be connected to various data sinks such as the telephone switch 340 and the internet server 330. Connecting to various data sinks facilitates bi-directional communications such as may be required for internet access or telephone service.

In the depicted embodiment, the back-channel receiver 380 is connected to the antenna array 390, and the back-channel communications are wireless communications. The wireless communications may occur with a spectrum historically dedicated to analog broadcast signals. In other embodiments, back-channel communications may be telephone modem communications, cellular network communications, internet communications, or the like.

In certain embodiments, back-channel communications are restricted to low bandwidth communications such as requests for specific content or programming selections. For example, in one embodiment, content selections may be made by placing a telephone call, accessing a web page, sending an email, or the like to the transmission facility 300 or a service installation or office associated therewith. The various elements of the enhanced digital services transmission facility 300 provide digital convergence to customers and allow customers to select desired content through back-channel communications.

Figure 4:
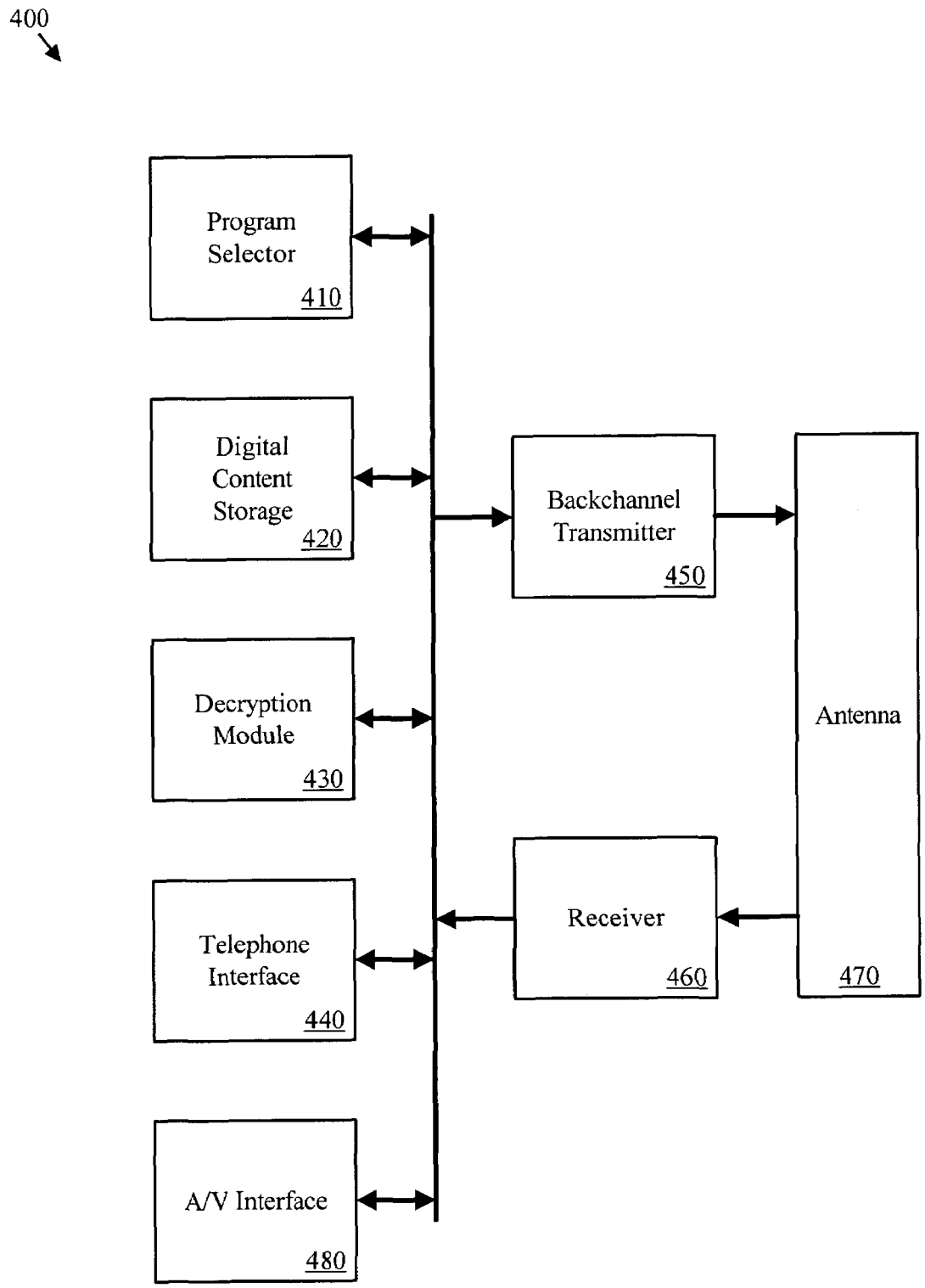
FIG. 4 is a block diagram illustrating one embodiment of an enhanced digital services transceiver of the present invention.

FIG. 4 is a block diagram illustrating one embodiment of an enhanced digital services transceiver 400 of the present invention. The depicted enhanced digital services transceiver 400 includes a program selector 410, a digital content storage 420, a decryption module 430, a telephone interface 440, a backchannel transmitter 450, a receiver 460, an antenna 470, and an A/V interface 480.

The program selector 410 facilitates selection of a program or specific content such as a movie, a video game, a song, or the like. In one embodiment, the program selector 410 interfaces with a programming selection channel (not shown) to present selection options to the user via the A/V interface 480.

The digital content storage 420 facilitates local storage of programming or digital content. In one embodiment, the digital content storage and the program selector 410 work together to record and store program selections at broadcast time and thereby facilitate deferred viewing of particular selections.

The decryption module 430 decrypts encrypted or encoded selections for viewing. The telephone interface 440 facilitates providing telephone services to a customer via a user channel and a back-channel. In one embodiment, the telephone interface includes an RJ-11 jack and support circuitry for supporting a standard telephone.

The back-channel transmitter 450 facilitates conducting back-channel communications. In the depicted embodiment, the back-channel transmitter 450 is connected to the antenna 470, and back-channel communications are wireless communications. The wireless communications may occur with a spectrum historically dedicated to analog broadcast signals. In other embodiments, back-channel communications may be telephone modem communications, cellular network communications, internet communications, or the like.

In certain embodiments, back-channel communications are restricted to low bandwidth communications such as requests for specific content or programming selections. For example, in one embodiment, content selections made via the program selector 410 may be made by placing a telephone call, accessing a web page, sending an email, or the like, to the transmission facility 300 or a service installation or office associated therewith.

The receiver 460 receives a digitally encoded transmission signal (not shown) from the antenna 470. In one embodiment, the digitally encoded transmission signal lies within a spectrum historically dedicated to analog broadcast signals, and the signal includes broadcast channels and user-requested channels. The receiver 460 converts a channel within the digitally encoded transmission signal to a digital data stream. The A/V interface 470 provides one or more audiovisual interfaces to related equipment such as computers, televisions, sound equipment, video monitors, or the like.

The enhanced digital services transceiver 400 provides a wide variety of functionality to a customer. In addition to the services and programming provided by traditional cable modems and the like, the transceiver 400 may support internet access, telephone services and the like. Unlike cable or DSL modems, the enhanced digital services transceiver 400 communicates wirelessly and consequently does not require dedicated wiring and other costly infrastructure in order to receive enhanced digital services.

Figure 5:
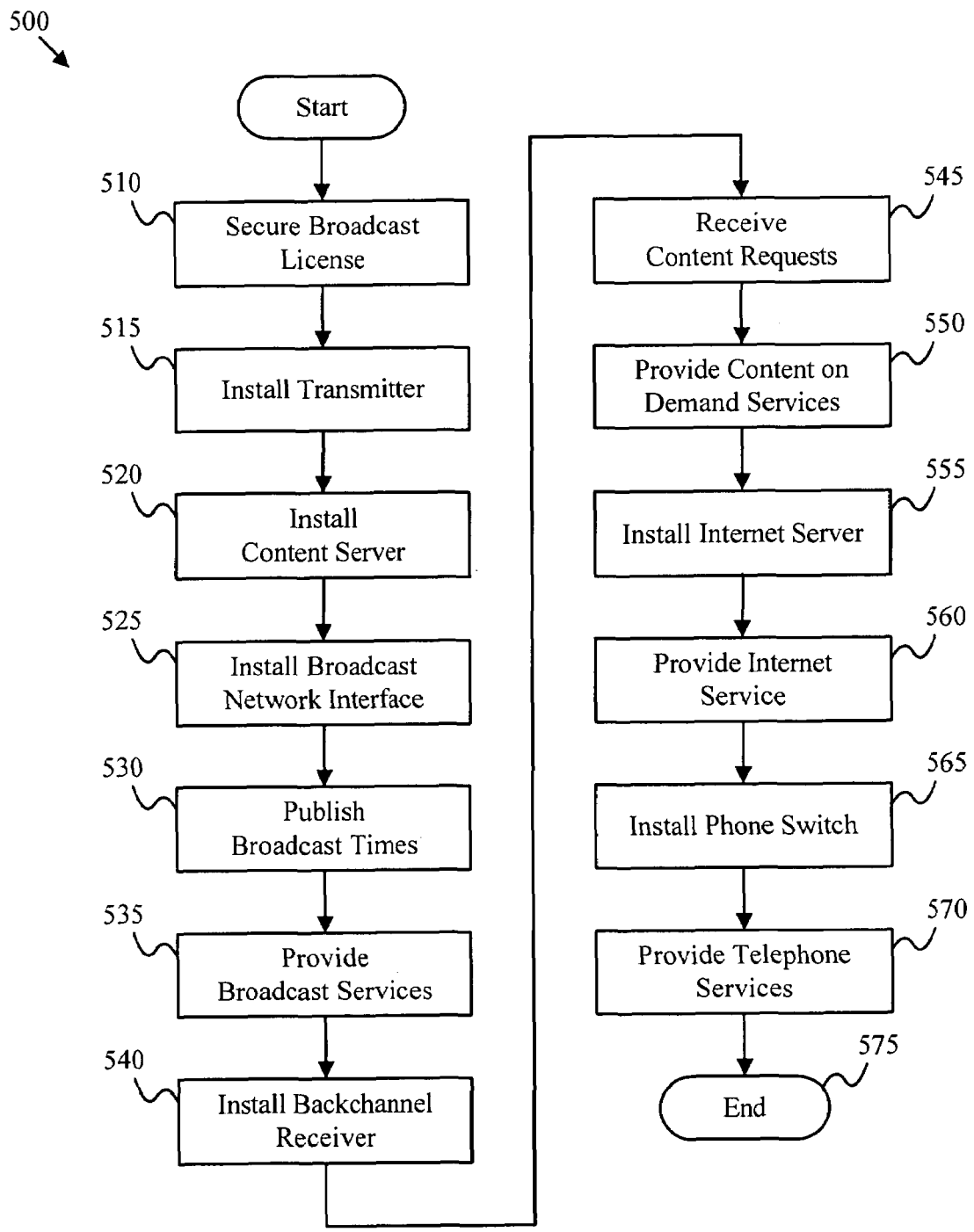
FIG. 5 is a flow chart diagram illustrating one embodiment of an enhanced digital services deployment method of the present invention.

FIG. 5 is a flow chart diagram illustrating one embodiment of an enhanced digital services deployment method 500 of the present invention. The depicted enhanced digital services deployment method 500 includes a secure broadcast license step 510, an install transmitter step 515, an install content server step 520, an install broadcast network interface step 525, a publish broadcast times step 530, a provide broadcast services step 535, an install backchannel receiver step 540, a receive content requests step 545, a provide content on demand services step 550, an install internet server step 555, a provide internet service step 560, an install phone switch step 565, a provide telephone services step 570, and an end step 575.

The enhanced digital services deployment method 500 facilitates providing a variety of digital content and services to consumer locations, such as the residences 210 of FIG. 2. The method begins by securing a broadcast license 510. In one embodiment, securing a broadcast license 510 includes obtaining a license from the Federal Communications Commission (FCC) to broadcast within a spectrum. In another embodiment, securing a broadcast license 510 includes obtaining a license from government agencies outside of the United States of America.

In response to securing a broadcast license 510, the method proceeds to the install transmitter step 515. At the install transmitter step 515, a transmitter is installed at a transmitting facility, such as the transmission facility 220 of FIG. 2. In one embodiment, installing a transmitter 515 includes retrofitting an existing transmission facility.

In addition to installing a transmitter 515, the method also installs a content server 520 and a broadcast network interface 525. By installing the content server 520, the method provides a repository for content such as television programs, videos, movies, video games, songs, and the like. Installing the broadcast network interface 525 provides an interface to transmit the content stored on the content server 520.

In one embodiment, the installing a transmitter 515, content server 520, and broadcast network interface 525 may occur in any order, including simultaneously. In addition, securing a broadcast license 510 may occur at substantially the same time or after the installing the transmitter, content server, and broadcast network interface.

In addition to installing various components and securing a broadcast license 510, the method may also include publishing broadcast times 530. In one embodiment, publishing broadcast times 530 includes publishing the times at which particular programs and content will be broadcast. For example, the time that a video game tournament will take place may be published on the internet or in print media, such as a newspaper, magazine, book, or the like.

The method enhanced digital services deployment method proceeds by providing broadcast services 535. In providing broadcast services 535, the method may transmit content on a broadcast channel to multiple customer locations, such as the residences 210 of FIG. 2. In one embodiment, the content provided by providing broadcast services 535 is transmitted at the broadcast times published in step 530. In another embodiment, content provided by the broadcast services 535, such as emergency news updates, is transmitted at an unpublished time.

The method also includes installing a backchannel receiver 540. In one embodiment, installing a backchannel receiver 540 includes installing backchannel receiver equipment at a transmission facility. In another embodiment, the backchannel receiver may be installed 540 at a facility separate from the transmission facility. By installing a backchannel receiver 540, the method provides means to receive requests for services from customer locations. In addition, installing a backchannel receiver 540 provides means for customers to interact via user channels.

Installation of the backchannel receiver 540 facilitates receiving content requests 545. Receiving content requests 545 may include receiving requests for specific content to be transmitted to a customer location. Alternatively, receiving content requests 545 includes receiving requests to discontinue transmission of specific content to customer locations. In one embodiment, receiving content requests 545 includes receiving back-channel communication, receiving a telephone call, receiving internet communication, and the like.

The method proceeds by providing content on demand services 550. Providing content on demand 550 may include authenticating a user encryption key, transmitting requested content to the user, tracking user requests and content activations, and charging a user account for content provided to the user. In one embodiment, providing content on demand 550 also includes stopping content transmittal to the user in response to a request from the user to cease content transmission.

The method continues by installing an internet server 555. Installing an internet server 555 allows the method to provide internet access and associated communications such as emails, ftp transfers, web pages, or the like to a customer location. In one embodiment, installing an internet server 555 is performed in conjunction with installing the transmitter 515, installing the content server 520, and installing the broadcast network interface 525. In addition, the aforementioned components may be installed at one transmission facility or at multiple facilities.

In response to installing an internet server 555, the method proceeds by providing internet service 560 to customer locations. In one embodiment, providing internet service 560 includes providing services performed by an internet service provide (ISP), such as internet access, email access, and web hosting. Internet service may be provided 560 in response to a request from a customer location. Alternatively, the internet service may be broadcast 560 to all customer locations, but only authorized customers may access the internet service.

The method may also include installing a phone switch 565. In the installing a phone switch step 565, the method provides a switch such as the telephone switch 340 of FIG. 3. Consequently, the method provides a foundation for telephone services to be broadcast on various channels. Indeed, the method continues by providing telephone services 570 to customer locations. In one embodiment, telephone services are provided 570 to mobile phones such as cellular phones and the like. The method completes with the end step 575.

In summary, the enhanced digital services deployment method 500 provides an infrastructure for broadcasting broadcast channels and transmitting user-requested channels while receiving back-channels associated therewith. The data provided on the broadcast channels may correspond to a variety of media content, including movies, video games, television programs, audio selections, and the like. By providing this variety of content from a centralized infrastructure, the method 500 of the present invention enables customers to receive programming customized to their particular needs through a common transmission medium.

Figure 6:
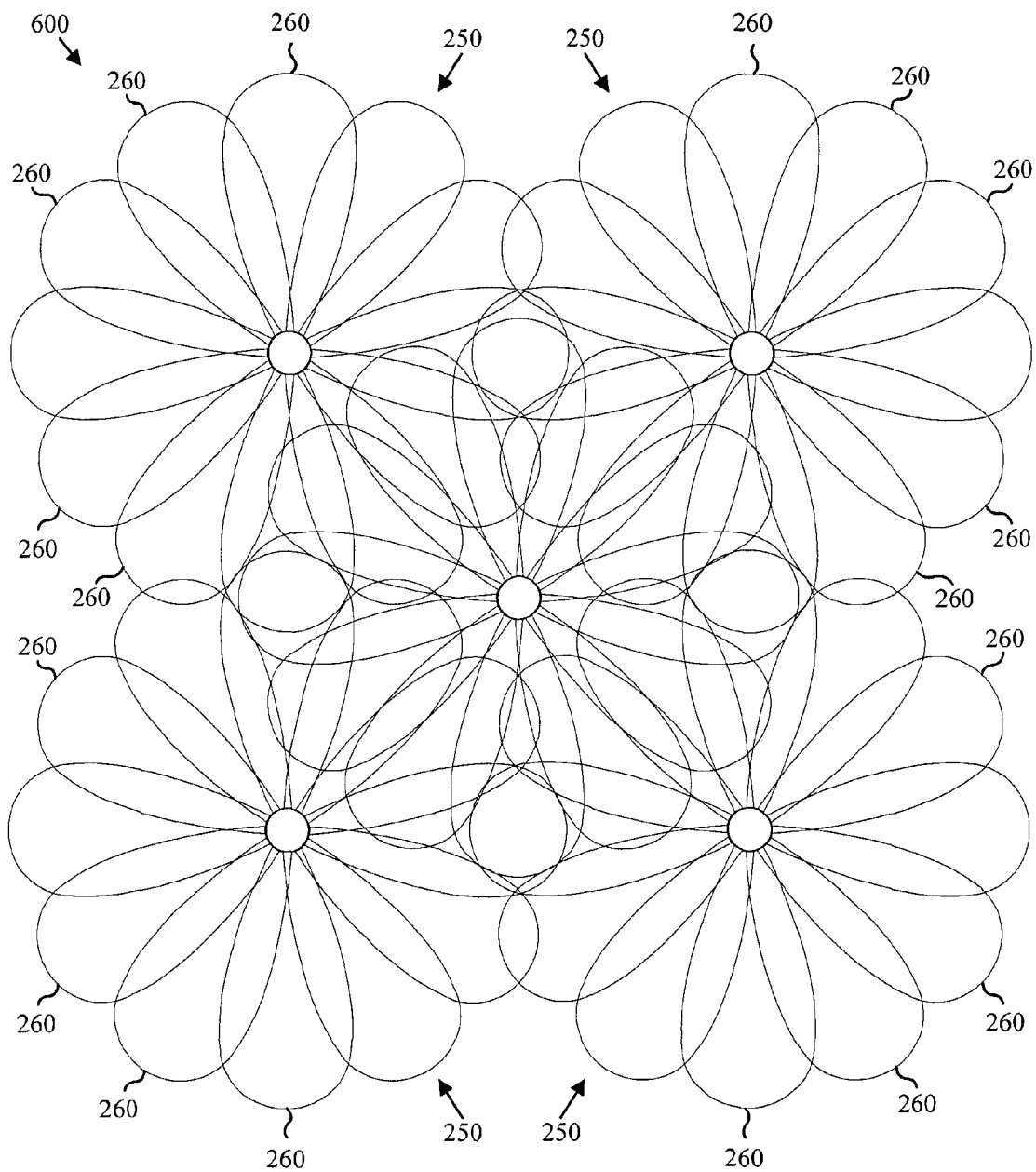
FIG. 6 is an illustration depicted one embodiment of a radiation pattern of the present invention.

FIG. 6 is an illustration depicting one embodiment of a wireless coverage pattern 600 of the present invention. The wireless coverage pattern 600 includes a set of radiation patterns 250, each of which correspond to a transmission tower (not shown) such as the transmission tower 230 in FIG. 2. Each depicted radiation pattern 250 includes a set of lobes 260. Each lobe 260 may correspond to a set of wireless channels such as spread spectrum channels that may carry data unique to the lobe.

The lobes 260 offer transmission directionality to wireless signals and facilitate discrimination over lobes 260 of other patterns 250. For example, discrimination may be achieved by usage of a directional antenna by a mobile or stationary customer. As a result of additional discrimination, the wireless coverage pattern 600 facilitates increased market penetration of the coverage pattern depicted in FIG. 2.

Figure 7:
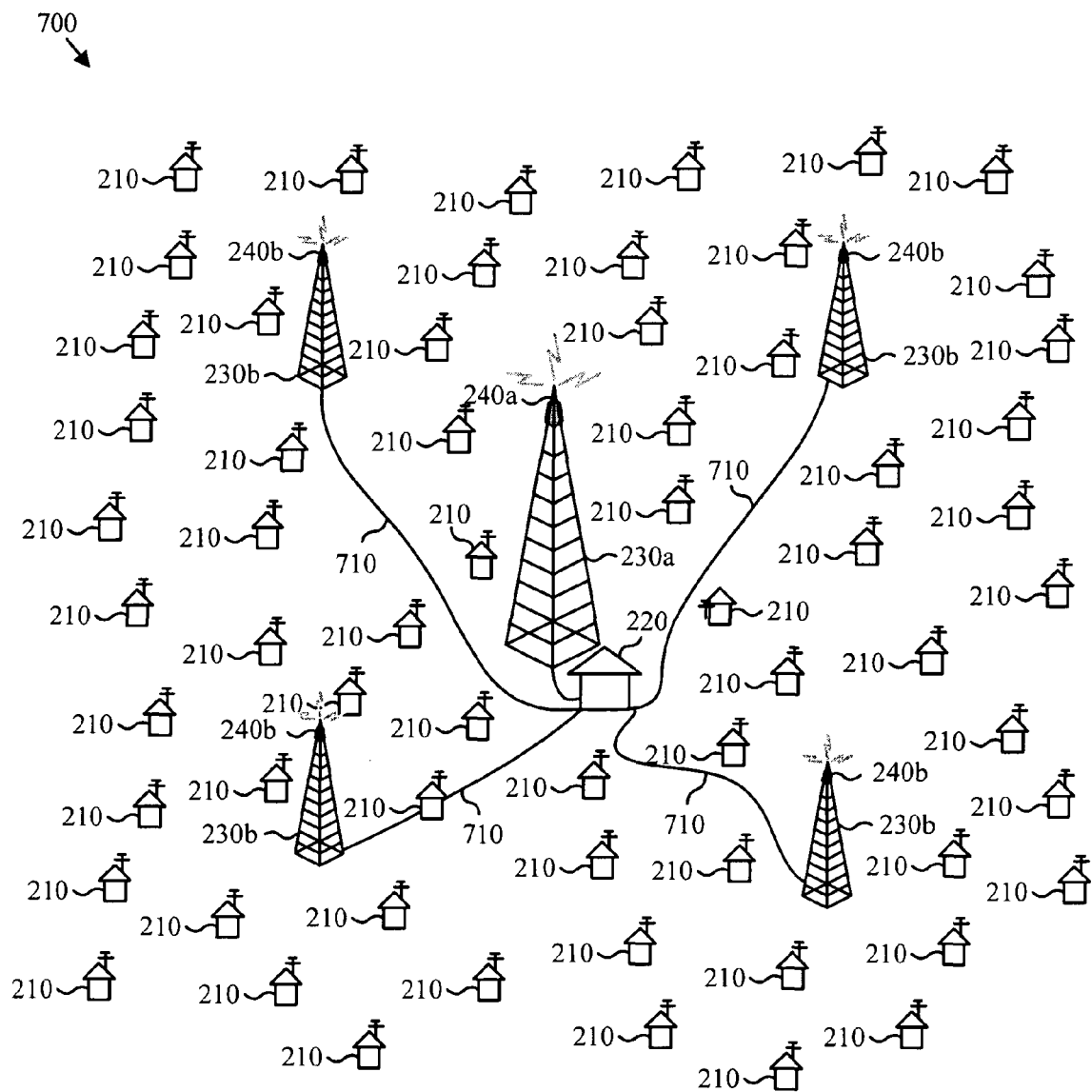
FIG. 7 is a schematic block diagram illustrating another embodiment of the enhanced digital services delivery system of the present invention.

FIG. 7 is a schematic block diagram illustrating an alternate embodiment of the enhanced digital services delivery system 200, namely the enhanced digital services delivery system 700 of the present invention. The enhanced digital services delivery system 700 uses the coverage pattern 600 of FIG. 6 to provide enhanced digital services to an entire geographic region at a higher penetration than is achievable with the enhanced digital services delivery system 200.

Similar to the enhanced digital services delivery system 200, the enhanced digital services delivery system 700 includes a number of residences 210 equipped with digital receivers such as the transceiver 400, a digital services transmission facility 220, a central transmission tower 230a and associated antenna(s) 240a. In addition the enhanced digital services delivery system 700 includes additional transmission towers 230b and associated antenna(s) 240b.

In certain embodiments, the central transmission tower 230a and associated antennas transmit the broadcast channels to the entire geographic region. In the aforementioned embodiment, the additional transmission towers 230b are dedicated to user-requested channels and associated back-channels. In one embodiment, the additional transmission towers 230b transmit and receive with a spectrum historically dedicated to analog broadcast signals to a digital services transmission facility 220. In another embodiment, the additional towers 230b transmit and receive within a non-licensed spectrum such as the 802.11 b or the 802.11 g spectrums.

The additional towers 230b may be connected to the transmission facility 220 via transmission links 710. The transmission links 710 may be dedicated links that are custom installed or links leveraged from existing infrastructure such as the telephone network. Using links leveraged from existing infrastructure significantly reduces the deployment cost of the present invention.

The present invention offers the advantages of cable and DSL technologies without the associated disadvantages. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for delivering digital services, the apparatus comprising:

a broadcast data source configured to provide digital broadcast data;

a user data source configured to provide digital user requested data;

a transmitter configured to transmit the digital broadcast data over an over-the-air data delivery system comprising at least a portion of an existing over-the-air analog broadcast system, the digital broadcast data being transmitted on a broadcast channel within a spectrum historically dedicated to analog broadcast signals; and the transmitter further configured to transmit the digital user requested data over the over-the-air data delivery system, the digital user requested data being transmitted on a user channel within the spectrum historically dedicated to analog broadcast signals; and the transmitter further configured to transmit one or more of the digital broadcast data and the digital user requested data on a first plurality of channels and a second plurality of channels, the first plurality of channels directionally transmitted in a first transmission pattern, the second plurality of channels directionally transmitted in a second transmission pattern, the second plurality of channels different at least in part from the first plurality of channels.

2. The apparatus of claim 1, wherein the spectrum historically dedicated to analog broadcast signals is selected from the group consisting of a FM spectrum, an AM spectrum, a VHF spectrum, and a UHF spectrum.

3. The apparatus of claim 1, wherein the broadcast data source is selected from the group consisting of a broadcast network, a digital content server, a telephone network, and an internet.

4. The apparatus of claim 1, further comprising a digital content server configured to store digital content.

5. The apparatus of claim 4, wherein the digital content server is further configured to encrypt digital content.

6. The apparatus of claim 4, wherein the digital content server fulfills digital content requests from a plurality of users, the digital content requests comprising communications selected from the group consisting of back-channel communications, telephone communications, email communications, and web page communications.

7. The apparatus of claim 1, further comprising at least one back-channel receiver configured to conduct back-channel communications.

8. The apparatus of claim 7, wherein the at least one back-channel receiver is selected from the group consisting of a telephone modem, a cellular phone receiver, a digital subscriber line interface, and a wireless receiver configured to receive a user back-channel within the spectrum historically dedicated to analog broadcast signals.

9. The apparatus of claim 7, wherein the back-channel communications include digital content requests.

10. The apparatus of claim 7, wherein the back-channel receiver is further configured to directionally receive data.

11. The apparatus of claim 1, wherein the digital broadcast data comprises digital content selected from the group consisting of an audio selection, a movie, a television program, a video game, a news program, a sporting event, an email message, and a web page.

12. The apparatus of claim 1, wherein the digital user requested data comprises digital content selected from the group consisting of an audio selection, a movie, a television program, a video game, a news program, a sporting event, an email message, and a web page.

13. An apparatus for receiving digital services, the apparatus comprising:

an antenna configured to receive a digitally encoded transmission signal within a spectrum historically dedicated to analog broadcast signals, the digitally encoded transmission signal comprising a plurality of channels including at least one broadcast channel and at least one user-requested channel and transmitted by a transmitter;

wherein the transmitter is configured to transmit one or more of digital broadcast data and digital user requested data on a first plurality of channels and a second plurality of channels, the first plurality of channels directionally transmitted in a first transmission pattern, the second plurality of channels directionally transmitted in a second transmission pattern, the second plurality of channels different at least in part from the first plurality of channels: and a receiver configured to convert a selected channel within the digitally encoded transmission signal to a digital data stream;

wherein the digitally encoded transmission signal is transmitted via an over-the-air data delivery system comprising at least a portion of an existing over-the-air analog broadcast system.

14. The apparatus of claim 13, further comprising a back-channel transmitter configured to conduct back-channel communications via the over-the-air data delivery system.

15. The apparatus of claim 14, wherein the back-channel transmitter is selected from the group consisting of a telephone modem, a cellular phone transmitter, a digital subscriber line interface, and a wireless transmitter configured to transmit within the spectrum historically dedicated to analog broadcast signals.

16. The apparatus of claim 14, wherein the back-channel communications comprise digitally encoding a back-channel transmission signal within the spectrum historically dedicated to analog broadcast signals.

17. The apparatus of claim 14, wherein the antenna is further configured to directionally transmit the back-channel transmission signal.

18. The apparatus of claim 13, wherein the antenna is further configured to directionally receive the digitally encoded transmission signal.

19. The apparatus of claim 13, wherein the digitally encoded transmission signal comprises at least one movie channel, at least one television program, and at least one telephone channel.

20. The apparatus of claim 13, wherein the spectrum historically dedicated to analog broadcast signals is selected from the group consisting of a FM spectrum, an AM spectrum, a VHF spectrum, and a UHF spectrum.

21. The apparatus of claim 13, further comprising a program selector configured to enable selection of digital content.

22. The apparatus of claim 13, further comprising a telephone interface configured to provide telephone services via the at least one user-requested channel.

23. The apparatus of claim 13, further comprising a decryption module configured to decrypt encrypted digital content.

24. The apparatus of claim 13, wherein the receiver is further configured to receive digital content selected from the group consisting of an audio selection, a movie, a television program, a video game, a news program, a sporting event, an email message, and a web page.

25. A method for delivering digital services, the method comprising:

securing a license to broadcast within a spectrum historically dedicated to an analog broadcast signal;

transmitting digital broadcast data via an over-the-air data delivery system comprising at least a portion of an existing over-the-air analog broadcast system, the digital broadcast data being transmitted on at least one broadcast channel within the historically dedicated spectrum; and transmitting digital user data via the over-the-air data delivery system on at least one user channel within the historically dedicated spectrum;

wherein transmitting further comprises transmitting one or more of the digital broadcast data and the digital user requested data with a first digital data stream on a first channel and a second digital data stream on the first channel, the first digital data stream directionally transmitted in a first transmission pattern, the second digital data stream directionally transmitted in a second transmission pattern, the second digital data stream comprising one or more of digital content and services substantially different from one or more of digital content and services of the first digital data stream.

26. The method of claim 25, wherein the license to broadcast is selected from the group consisting of a FM license, an AM license, a VHF license, and a UHF license.

27. The method of claim 25, wherein transmitting digital data is conducted in a manner that precludes transmission of the analog broadcast signal.

28. The method of claim 25, further comprising receiving data via the over-the-air data delivery system on at least one user back-channel.

29. The method of claim 27, wherein receiving data on the at least one user back-channel comprises communications selected from the group consisting telephone modem communications, cellular phone communications, digital subscriber line communications, internet communications, and wireless communications within the spectrum historically dedicated to analog broadcast signals.

30. The method of claim 27, wherein receiving data on at least one user back-channel comprises directionally receiving a back-channel transmission signal from a user.

31. The method of claim 25, further comprising receiving a request for digital content on a user back-channel.

32. The method of claim 31, wherein receiving a request for digital content comprises an action selected from the group consisting of communicating on a back-channel, receiving a telephone call, receiving internet communications, and hosting a web page.

33. The method of claim 25, further comprising providing an encryption key configured to enable reception of encrypted digital content.

34. The method of claim 25, wherein providing the encryption key comprises an action selected from the group consisting of communicating on a user back-channel, receiving a telephone call, receiving internet communications, and hosting a web page.

35. The method of claim 25, wherein the broadcast data comprises digital content selected from the group consisting of an audio selection, a movie, a television program, a video game, a news program, a sporting event, an email message, and a web page.

36. The method of claim 25, wherein the user data comprises digital content selected from the group consisting of an audio selection, a movie, a television program, a video game, a news program, a sporting event, an email message, and a web page.

37. The method of claim 25, further comprising receiving a program selection from a user.

38. The method of claim 25, further receiving a program series selection from a user.

39. The method of claim 25, wherein the broadcast data is broadcast at a published time.

40. The method of the claim 39, wherein the published time is published in a newspaper.

41. The method of claim 39, wherein the published time is published via a programming selection channel.

42. The method of claim 25, wherein the broadcast data comprises a digital edition of a newspaper.

43. The method of claim 42, wherein the digital edition of the newspaper has format substantially equal to a printed edition of the newspaper.

44. The method of claim 25, further comprising installing a digital services delivery component selected from the group consisting of a transmitter, a content server, a broadcast network interface, a back-channel receiver, an internet server, and a phone switch.

45. A method for receiving digital services, the method comprising:
receiving a digitally encoded transmission signal within a spectrum historically dedicated to analog broadcast signals the digitally encoded transmission signal transmitted by a transmitter;
wherein the transmitter is configured to transmit one or more of digital broadcast data and digital user requested data with a first digital data stream on a first channel and a second digital data stream on the first channel, the first digital data stream directionally transmitted in a first transmission pattern, the second digital data stream directionally transmitted in a second transmission pattern, the second digital data stream comprising one or more of digital content and services substantially different from one or more of digital content and services of the first digital data stream; and
converting the digitally encoded transmission signal to a digital data stream;
wherein the digitally encoded transmission signal is transmitted via an over-the-air data delivery system comprising at least a portion of an existing over-the-air analog broadcast system.

46. The method of claim 45, further comprising transmitting a digitally encoded back-channel transmission signal via the over-the-air data delivery system within a spectrum historically dedicated to analog broadcast signals.

47. The method of claim 46, wherein the digitally encoded back-channel transmission is directionally transmitted.

48. The method of claim 45, wherein the digitally encoded transmission signal is directionally received.

49. The method of claim 45, wherein the digitally encoded transmission signal comprises at least one movie channel, at least one television program, and at least one telephone channel.

50. The method of claim 45, wherein the digitally encoded transmission signal comprises a digital edition of a newspaper.

51. The method of claim 50, wherein a format of the digital edition of a newspaper is substantially equal to a printed edition format.

52. The method of claim 45, wherein the spectrum historically dedicated to analog broadcast signals is selected from the group consisting of a FM spectrum, an AM spectrum, a VHF spectrum, and a UHF spectrum.

53. The method of claim 45, further comprising transmitting data on a user back-channel.

54. The method of claim 53, wherein transmitting data on a user back-channel comprises communications selected from the group consisting telephone modem communications, cellular network communications, internet communications, and wireless communications within the spectrum historically dedicated to analog broadcast signals.

55. The method of claim 53, wherein transmitting data on a user back-channel comprises directionally transmitting data.

56. The method of claim 45, further comprising requesting digital content on a user channel.

57. The method of claim 56, wherein requesting digital content comprises an action selected from the group consisting of communicating on a back-channel, placing a telephone call, accessing the internet, and visiting a web page.

58. The method of claim 45, further comprising purchasing an encryption key configured to enable reception of encrypted digital content.

59. The method of claim 58, wherein purchasing the encryption key comprises an action selected from the group consisting of communicating on a back-channel, placing a telephone call, accessing the internet, and visiting a web page.

60. The method of claim 45, wherein the digital data stream comprises digital content selected from the group consisting of an audio selection, a movie, a television program, a video game, a news program, a sporting event, an email message, and a web page.

61. The method of claim 45, further comprising selecting a program.

62. The method of claim 45, further comprising selecting a program series.

63. The method of claim 45, wherein digital data stream comprises a digital edition of a newspaper.

64. The method of claim 63, wherein the digital edition of the newspaper has a format substantially equal to a printed edition of the newspaper.

65. A method for providing digital services, the method comprising:
    securing a license to broadcast within a spectrum historically dedicated to an analog broadcast signal;
    transmitting a first digital data stream via an over-the-air data delivery system comprising at least a portion of an existing over-the-air analog broadcast system, the first digital data stream being directionally transmitted on a first channel in a first transmission pattern; and
    concurrently transmitting a second digital data stream via the over-the-air data delivery system on the first channel in a second transmission pattern, the second digital data stream transmitted directionally and comprising one or more of digital content and services substantially different from one or more of digital content and services of the first digital data stream.

66. The method of claim 65, further comprising providing wireless telephone service.

67. A system for delivering digital services, the system comprising:
    a transmitter configured to transmit digital broadcast data over an over-the-air data delivery system comprising at least a portion of an existing over-the-air analog broadcast system, the digital broadcast data being transmitted on a plurality of broadcast channels within a spectrum historically dedicated to analog broadcast signals and concurrently transmit digital user requested data over the over-the-air delivery system on a plurality of user channels within the spectrum historically dedicated to analog broadcast signals;
    the transmitter further configured to transmit the digital user requested data on a first plurality of user channels and a second plurality of user channels, the first plurality of user channels directionally transmitted in a first transmission pattern, the second plurality of user channels directionally transmitted in a second transmission pattern, the second plurality of user channels different at least in part from the first plurality of user channels; and
    a receiver configured to convert a selected broadcast channel of the plurality of broadcast channels to a digital data stream.

68. The system of claim 67, wherein the spectrum historically dedicated to analog broadcast signals is selected from the group consisting of a FM spectrum, an AM spectrum, a VHF spectrum, and a UHF spectrum.

69. The system of claim 67, wherein the broadcast data is received from a data source selected from the group consisting of a broadcast network, a digital content server, a telephone network, and an internet.

70. The system of claim 67, further comprising a back-channel receiver configured to conduct back-channel communications.

71. The system of claim 70, wherein the back-channel receiver is selected from the group consisting of a telephone modem, a cellular phone receiver, a digital subscriber line interface, and a wireless receiver configured to a user back-channel within the spectrum historically dedicated to analog broadcast signals.

72. The system of claim 70, wherein the back-channel communications include digital content requests.

73. The system of claim 70, wherein the back-channel receiver is further configured to directionally receive data.

74. The system of claim 67, wherein the broadcast data comprises digital content selected from the group consisting of an audio selection, a movie, a television program, a video game, a news program, a sporting event, an email message, and a web page.

75. The system of claim 67, wherein the user requested data comprises digital content selected from the group consisting of an audio selection, a movie, a television program, a video game, a news program, a sporting event, an email message, and a web page.

76. The system of claim 67, further comprising a digital content server configured to fulfill digital content requests from a plurality of users.

77. The system of claim 76, wherein the digital content server is further configured to encrypt digital content.

78. The system of claim 67, further comprising a back-channel transmitter configured to conduct back-channel communications.

79. The system of claim 78, wherein the back-channel transmitter is selected from the group consisting of a telephone modem, a cellular phone transmitter, a digital subscriber line interface, and a wireless transmitter configured to transmit within the spectrum historically dedicated to analog broadcast signals.

80. The system of claim 78, wherein the back-channel communications comprise digitally encoding a back-channel transmission signal within the spectrum historically dedicated to analog broadcast signals.

81. The apparatus of claim 67, wherein the receiver is further configured to receive digital content selected from the group consisting of an audio selection, a movie, a television program, a video game, a news program, a sporting event, an email message, and a web page.

82. An apparatus for delivery telephone service to a geographic region, the apparatus comprising:
    a transmitter configured to transmit telephony data over an over-the-air data delivery system comprising at least a portion of an existing over-the-air analog broadcast system, the telephony data being transmitted on a plurality of user channels within a spectrum historically dedicated to analog broadcast signals;
    the transmitter further configured to transmit telephony data with a first telephony data stream on a first channel and a second telephony data stream on the first channel, the first telephony data stream directionally transmitted in a first transmission pattern, the second telephony data stream directionally transmitted in a second transmission pattern, the second telephony data stream comprising telephony data substantially different from telephony data of the first telephony data stream a back-channel receiver configured to receive telephony data over the over-the-air data delivery system on a plurality of back-channels.

83. The apparatus of claim 82, wherein the spectrum historically dedicated to analog broadcast signals is selected from the group consisting of a FM spectrum, an AM spectrum, a VHF spectrum, and a UHF spectrum.

84. The apparatus of claim 82, wherein the back-channels are transmitted within the spectrum historically dedicated to analog broadcast signals.

* * * * *